United States Patent [19]

Shimp

[11] Patent Number: 4,932,157
[45] Date of Patent: Jun. 12, 1990

[54] TREE SURROUND

[76] Inventor: Nathan B. Shimp, R.R. #3, Box 91F, Palmyra, Mo. 63461

[21] Appl. No.: 359,584

[22] Filed: Jun. 1, 1989

[51] Int. Cl.$^5$ .............................................. A01G 17/00
[52] U.S. Cl. .......................................... 47/25; 47/32
[58] Field of Search ...................... 47/32, 33, 48.5, 25

[56] References Cited

U.S. PATENT DOCUMENTS

| 3,621,611 | 11/1971 | Wingerter | 52/DIG. 9 |
| 3,692,281 | 9/1972 | Clayton | 52/DIG. 9 |
| 3,727,347 | 4/1973 | Barnes | 47/32 |
| 3,803,792 | 4/1974 | Fulton | 52/DIG. 9 |

FOREIGN PATENT DOCUMENTS

| 2031196 | 1/1972 | Fed. Rep. of Germany | 47/32 |
| 2705375 | 6/1976 | Fed. Rep. of Germany | 47/33 |
| 1465465 | 1/1967 | France | 47/32 |

OTHER PUBLICATIONS

Science and Invention, May 1926, p. 54.

*Primary Examiner*—Henry E. Raduazo
*Attorney, Agent, or Firm*—Frank B. Robb

[57] ABSTRACT

A tree surround which is provided to confine shredded or bark material at the base of a tree for the purpose of retaining moisture and likewise prevent the growth of weeds thereby maintaining neat appearance of the tree area, the surround being made from tire carcasses, specifically the sidewalls thereof which would normally be a problem to dispose of and costly to otherwise destroy, the shape of the sidewall and the contact of the severed outer periphery with the ground making possible use of power equipment to trim weeds which may grow near such periphery.

4 Claims, 1 Drawing Sheet

TREE SURROUND

BACKGROUND OF THE INVENTION

This invention relates to tree surrounds which are intended to be placed around trees for various purposes such as to contain leaves or other moisture retaining material and to prevent the growth of weeds or to prevent damage to the tree trunk by normal traffic used for gardening purposes.

Further cutting of weeds around the tree may be effected by power mowers which will ride over the periphery of the surround for that purpose.

In this particular instance also however, it is intended that the surround hereof shall provide a receptacle in a sense for chopped wood or similar bark or other useful material which will prevent the growth of weeds and at the same time hold moisture for use by the tree in its growth.

It is a further contemplation of this invention that certain scrap materials which are very readily available in our society shall provide a useful function instead of merely taking up space in a dump some place and being difficult to dispose of because of their composition.

In this connection, it is notable that the invention hereof contemplates the use of old tire casings or of course they could be new tire casings if the tires themselves are no longer useful, but in any event old tire casings are contemplated to be used since they would normally be thrown away. By use of such casings according to the practice of this invention the same will serve a definitely useful purpose and not in any event therefore be occupying dump space which might be useful for disposing of other materials.

GENERAL DESCRIPTION OF THE INVENTION

The invention hereof contemplates the use of old truck tires primarily which have some useful portions left, since the tread will undoubtedly have been worn away and the tire is probably not recappable. In this instance the concept is that of the use of the side walls of said tires to make tree surrounds or the like, and also useful for use in connection with shrubbery or other plants where the trimming of weeds may be a problem.

The removal of the tread section of the tire will make two side wall areas available for the purposes of this invention. It is pointed out that by severing the side walls of the tires, that is by removing the tread section adjacent the outer periphery of each sidewall, a generally circular element is left, in fact two of them are left if both are severed from the tread section.

The parts thus provided are subsequently sliced in a manner to facilitate placing them around a tree or the like and thereby in position for use in the manner to be described in detail hereinafter.

By way of illustration and in conjunction with the specification, there is shown in the appended drawing an example of the manner in which the invention is found to be useful wherein.

DETAILED DESCRIPTION OF THE INVENTION

Figure 3:
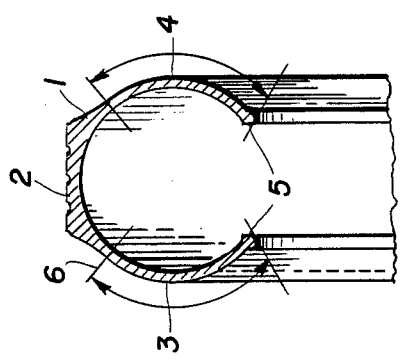
FIG. 3 is a fragmentary view in section to illustrate how the device is formed.
Figure 5:
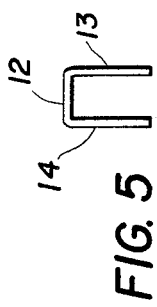
FIG. 5 is an elevational view of a fastener used in connection with the surround.

Turning to a consideration of FIG. 3, initially, in order to provide the description of the concept, it is noted that a truck tire is generally denoted at 1 as including a tread section 2, a sidewall 3, a sidewall 4, beads 5 at the inner peripheries of said sidewalls, it being obvious that the tread section is at the outer periphery of said sidewalls 3 and 4.

The bead at what will now become the inner periphery 8 of the surround created by the foregoing is desirably left intact, since it will add stiffness and prevent distortion and displacement if a mover or the like is driven over the outer periphery, now the edge.

Figure 1:
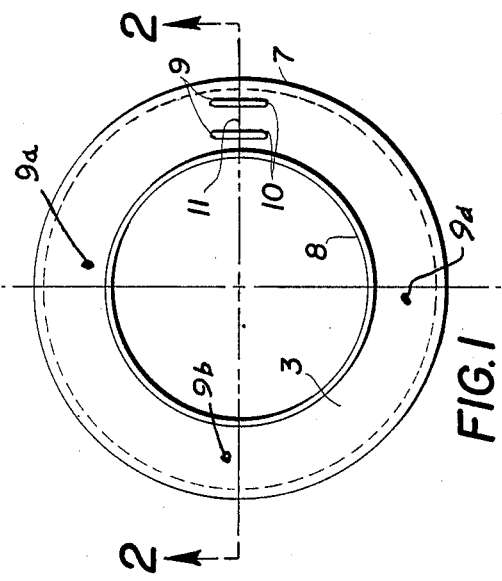
FIG. 1 is a plan view of the surround hereof.
Figure 2:
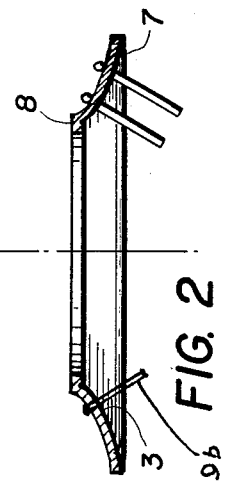
FIG. 2 is a horizontal sectional view of the device.

With the foregoing understanding, it is contemplated that the tread section 2 be severed at the line 6 for example and leaving the sidewall section 3 at its outer periphery with a circular edge as indicated at 7 in FIG. 1 as well as FIG. 2.

A similar action having taken place with respect to the side wall 4 will provide a similar object as shown in FIGS. 1 and 2 to provide the basic elements useful as described herein.

It will thus be apparent that the side wall 3 of FIG. 3 is, as shown in FIGS. 1 and 2 a somewhat concave, generally round element.

Subsequently pairs of holes are drilled or punched at 9 and 10 so as to be aligned and of any preferred size, extending through the thus formed body of the tree surround. Other holes 9a will also be drilled or punched through the body as shown for purposes to be explained.

Figure 4:
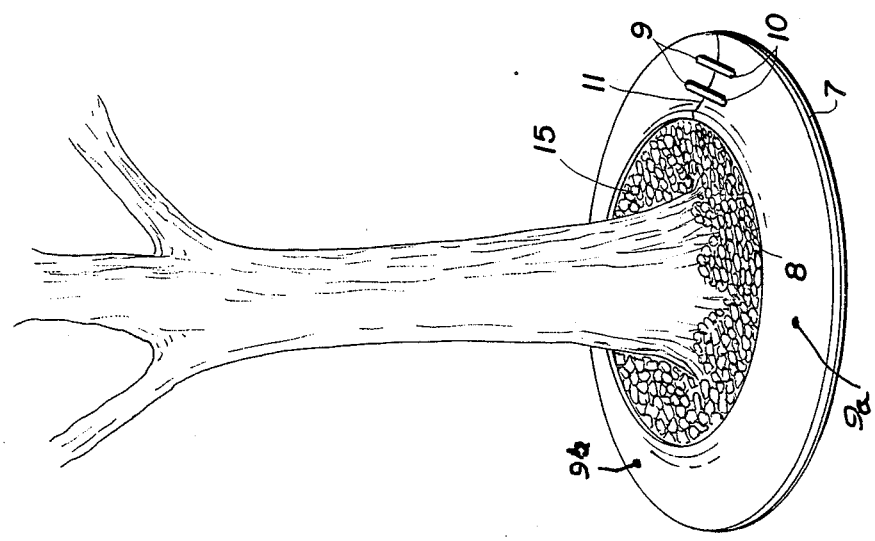

After that takes place, a line of severance is effected at 11 on a radius of the tire sidewall body to thereby provide ends which may be separated and permit the body to be placed around a tree along the lines of FIG. 4.

Thereafter a pair of fastening elements 12 will preferably be provided, of generally U-shaped configuration, like a staple including the legs 13 and 14 as shown.

Two staples are subsequently positioned so that the legs or tines 13 and 14 enter the holes 10 and 11 for example.

Large nail-like parts or similar elements 9b may be driven into the ground through the holes 9a, to further position and maintain the surround in place.

Since the staples or fasteners 12 will be of elongated nature they will penetrate into the earth to maintain the surround in position and by suitable adjustment fix the said surround as to the body thereof in the position substantially as indicated in FIG. 4.

Again it is noted that with the various parts in the positions described heretofore, if a mower or other power equipment or the like is driven over the periphery, it will not displace or move the surround positioned by the means described. Such mower may will be unlikely to strike the tree trunk since it will not be necessary to mow closely thereto.

Thereafter since the body 3 will be positioned on the surface of the earth at its outer periphery 7, the inner periphery 8 being spaced from the tree will allow the emplacement of tree bark or other suitable chips such as 15 within the inner periphery of the body. Material so placed will be retrained therein to prevent the growth of weeds or the like and also to provide the necessary moisture retention desired for growth of the plant which is within the surround.

It will thus be understood that by the disclosure hereof, the side walls of an otherwise worn out truck tire for example may serve a further useful purpose. Although a tire from an automobile could be used, it would probably not be as stiff nor as large as desirable under most circumstances to provide for the containment of the chips and other moisture retaining material. However, a tire sidewall might be useful for a surround where the plant is small, or even in the protection of shrubs.

It will be readily noted that the method of making the tree surrounds is novel in itself, in that it involves the severing of the side walls of the tire as indicated so as to provide the inner and outer peripheral edges and thus a sort of ring-like device which by fastening the ends together after the body is cut, will be retained in position for its intended purpose.

The novel concept of severing the tread section thus leaving the side walls and beads thereon as formed without further necessity to do more than cut radially and punch or drill the same to provide the holes described, will provide a unique and valuable container in a sense.

I claim:

1. A tree surround formed from a vehicle tire having a sidewall portion with a concave inner surface and a tread portion comprising:
   a body formed from the tire sidewall portion, said sidewall portion being cut circumferentially to form abutting ends and said tread portion being removed therefrom;
   said sidewall being separated at said cut and placed on the ground to enclose the ground surface about the base of a tree or the like with the concave inner surface of said sidewall portion uppermost; and
   a first connector means which penetrates said abutting ends and the ground surface to position said body in position about said tree or the like.

2. A tree surround as in claim 1 and further including the ground enclosed by said body being covered with a material which will prevent or inhibit the growth of weeds and retain moisture.

3. A tree surround as in claim 1 and further including additional connector means penetrating said body and said ground surface to secure said body in place.

4. A tree surround as in claim 1 wherein said first connector means is of U-shaped configuration.

* * * * *